July 3, 1962 W. HERMES 3,042,839

DIRECT-VOLTAGE MONITORING CIRCUIT

Filed Oct. 29, 1959

INVENTOR willem hermes

BY

Frank R. Jinfani

AGENT

United States Patent Office 3,042,839
Patented July 3, 1962

3,042,839

DIRECT-VOLTAGE MONITORING CIRCUIT

Willem Hermes, Hilversum, Netherlands, assignor to North American Philips Company, Inc., New York, N.Y., a corporation of Delaware Filed Oct. 29, 1959, Ser. No. 849,582
Claims priority, application Netherlands Dec. 2, 1958
7 Claims. (Cl. 317—146)

Figure 1:
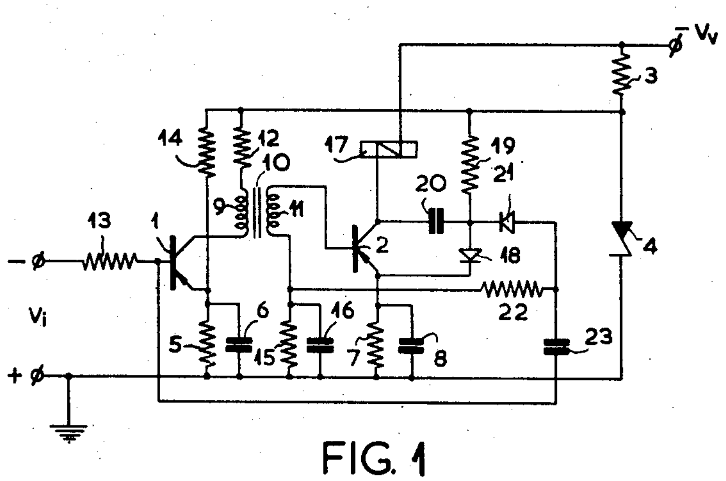

The proper operation of many professional telecommunication arrangements and of many measuring devices imposes the requirement that one or more supply voltages for the receiving or transmitting equipment or for the measuring device shall remain within determined limits.

This requirement is usually fufilled by means of one or more direct-voltage stabilizing devices. However, such devices are not inherently always effective and, in addition, they can maintain the supply voltage within determined narrow limits only if the supply voltage to be stabilized does not vary unduly. Such unduly strong variations may occur more particularly in telecommunication equipments supplied through a transmission line, as a result of an accidental strong variation in the damping of the line. This variation may result in an interruption of the communication or in impermissible distortion or cross-talk. In measuring devices, such unnoticed variations also result in unnoticed and frequently considerable measurement errors.

In order to minimize the consequences of a supply voltage exceeding the permissible limits, which consequences may be very disadvantageous under certain conditions, and also to indicate the impermissible variations of this voltage, it is known to utilize a monitoring circuit. In "Electronics" of October 1955, pages 202, 204, 206 and 208, such a circuit is described which comprises a regeneratively fed-back amplifier operating as a bistable trigger and a source of reference voltage which biases the control electrode of an amplifying element of the amplifier so that for direct input voltages having values lying on a given side of a threshold value, the main current path of this element is substantially cut off. In order to prevent a direct voltage from exceeding a maximum value and falling below a minimum value, it would naturally be possible to use a combination of two such circuits, for example for controlling the energization of a relay. However, a monitoring circuit having such a structure would be comparatively bulky, expensive and complicated in proportion to the object attained.

The present invention provides a very simple direct-voltage monitoring circuit of the kind described, by which a direct voltage may be prevented from exceeding a maximum value and falling below a minimum value. This circuit is characterized in that the amplification and the regenerative feed-back factor of the amplifier are chosen to be such that the amplifier oscillates if the relevant threshold value is exceeded by the direct input voltage and that the main current path of an amplifying element of the amplifier includes so high a load resistance that this amplifying element is saturated if a second threshold value is exceeded by the direct input voltage so that the amplication factor of the amplifier, including its feedback circuit, becomes smaller than unity and the amplifier thus no longer oscillates. A relay may be coupled to the amplifier which has its energization dependent on the condition of the amplifier.

Figure 2:
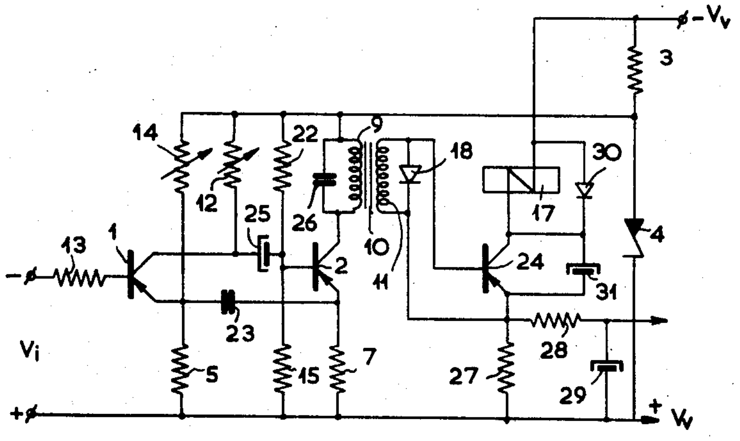

In order that the invention may be readily carried into effect, two emodiments thereof will now be described in detail, by way of example, with reference to the accompanying drawing, showing the circuit diagrams of two direct-voltage monitoring circuits according to the invention, wherein:

FIG. 1 shows the circuit diagram of a first embodiment of the direct-voltage monitoring circuit according to the invention; and FIG. 2 shows the circuit diagram of a second embodiment of said monitoring device.

The direct voltage monitoring circuit shown in FIG. 1 comprises a regeneratively feedback amplifier having transistors 1 and 2 which in the case under consideration are of the PNP-type. The two transistors are fed from a negative terminal $-V_v$ of a voltage source, from which a reference voltage is also derived by means of a resistor 3 and a Zener diode 4 which operates as a stabilizer. The emitters of the two transistors are connected to earth and to the positive terminal of the voltage source via resistors 5 and 7 respectively, which are shunted by capacitors 6 and 8 respectively. The collector of transistor 1 is connected to the common terminal of resistor 3 and of diode 4, and hence to the stabilized voltage, via a primary winding 9 of a coupling transformer 10 and a resistor 12 of a value such that transistor 1 can be comparatively easily bottomed or saturated. The base of transistor 1 is connected to the input terminal through a series resistor 13. A resistor 14, together with the emitter resistor 5, constitutes a voltage divider so that, when transistor 1 is cut off, its emitter electrode is maintained at a stabilized reference potential.

The transformer 10 has a secondary winding 11 which, in series with a base resistor 15 shunted by a capacitor 16, is included in the base circuit of transistor 2. The collector circuit of transistor 2 includes an energizing winding 17 of a relay, which winding is connected directly to the terminal $-V_v$. The circuit also includes a detector having a diode 18 and a resistor 19, through which this diode is biased in the cut-off direction. The common point of resistor 19 and diode 18 is coupled to the collector of transistor 2 by means of a capacitor 20.

The resistor 19 is connected, at one end, to the stabilized supply voltage, the cathode of diode 18 being coupled to the emitter of transistor 2. A further diode 21 is connected in the forward direction to the common point of diode 18 and of resistor 19. The anode of diode 18 in turn is connected to the common point of secondary winding 11 and of base resistor 15, via a resistor 22, and to the base of transistor 1 via a capacitor 23.

In the absence of an input voltage $V_i$, transistor 1 is cut off, since its emitter is at a negative reference potential, whereas its base is connected to earth. However, transistor 2 is weakly conducting, since a low forward voltage is applied to its base via resistor 19, diode 21, resistor 22 and winding 11. Its quiescent current is approximately 0.5 ma.

If a negative voltage $V_i$ applied to the upper input terminal and, via resistor 13, to the base of transistor 1 reaches a first threshold value, said transistor becomes conducting. This threshold value is a little higher than the stabilized reference voltage of its emitter. As soon as transistor 1 becomes conducting, the amplifier starts to operate as a relaxation oscillator, since the amplification via the closed loop comprising transistor 1, transformer 10, transistor 2, capacitor 20, diode 21 and capacitor 23 is higher than unity. The frequency of the oscillations thus produced is determined by transformer 10 and by the coupling network including capacitors 20 and 23, which network also exhibits certain phase-shifting properties. Transistor 1 is alternately saturated and cut off, the oscillations produced across winding 17 and transmitted via capacitor 20 being rectified by the diodes 18 and 21 which, together with the capacitors 20, 16 and 8, constitute a voltage-doubling rectifier. The common point of resistor 19 and diode 18 is initially at a negative threshold potential which is determined by the voltage across the Zener diode 4 and the values of resistors 19, 22 and 15, as well as by the base current of transistor 2 in the quiescent condition and by the initial forward resistance of diode 21. Due to rectification of the oscillations produced, this common point becomes more strongly negative, so that the negative bias applied to the base of transistor 2 via diode 21 and resistor 22 also increases. Transistor 2 thus becomes strongly conducting and the relay is energized by its energizing winding 17. This effect is also enhanced due to the increase in the resistance of diode 21 with increasing current through this diode.

If the negative potential at the upper input terminal increases further, the amplifier keeps oscillating and the relay is energized by its energizing winding 17, until the value of said potential exceeds a second threshold value. Upon increase of the negative input potential, the mean base current of the oscillating transistor 1 actually increases and hence also its collector current, until this transistor is bottomed or saturated due to the presence of resistor 12, its mean collector potential then differing but slightly from its stabilized emitter potential. If such is the case, the amplification via the amplifier and its regenerative feedback loop greatly decreases since transistor 1 practically no longer amplifies, so that the circuit stops oscillating.

When the value of the negative input potential again decreases, the amplifier starts oscillating again as soon as this value decreases below the second threshold value and transistor 1 comes out of its condition of saturation. The amplifier then oscillates further until the negative input potential has fallen below the first-mentioned threshold value and transistor 1 is again cut off.

Due to the regenerative direct-current feedback via diode 21 and resistor 22, the relay is always energized when the amplifier is oscillating, whereas the quiescent current of transistor 2 is insufficient for energizing said relay.

The diode 21 may, of course, be replaced by another variable impedance, the value of which varies as a function of the rectified oscillations of the amplifier so that the regenerative feedback factor increases in the presence of amplifier oscillations. However, the operation of the rectifier would then be less favourable. The presence of diode 21 or of another such variable impedance is very important in view of the fact that sudden energization or release of the relay dependent on the direct input voltage is thereby secured.

As shown in FIG. 2, instead of transformer 10, it is alternatively possible to couple the collector of the first transistor 1 to the base of the second transistor 2, by means of an RC-network 12, 25. This hardly changes the operation of the amplifier, since the latter operates as a relaxation oscillator as soon as the negative potential at the upper input terminal exceeds the aforementioned first threshold value. However, the use of a transformer renders the circuit more sensitive and/or it is possible to use transistors having a lower current gain factor.

In the embodiment shown in FIG. 2, the current for energizing relay 17 is supplied by a third transistor 24. This transistor is coupled to the relaxation oscillator including the transistors 1 and 2 by means of transformer 10, the primary winding 9 of which is included in the collector circuit of transistor 2 and the secondary winding 11 of which constitutes the base-emitter circuit of transistor 24, so that a current pulse through the collector circuit of transistor 2 brings about a forward current pulse in the base-emitter circuit of transistor 24. The low forward input resistance of transistor 24 is adapted to the output impedance of transistor 2 in the strongly conducting condition, by means of transformer 10, so that transistor 24 is bottomed or saturated at each current pulse through the collector circuit of transistor 2. When transistor 2 is cut off, transistor 24 is also cut off.

A small capacitor 26 is connected in parallel with the primary winding 9 of transformer 10, in order to round off slightly the wave form of the collector current pulses and hence thus suppress high upper harmonics. Connected in parallel with secondary winding 11 is a rectifier 18 which suppresses the large inverse voltage peaks which are produced when transistor 2 is cut off. Said rectifier could alternatively be replaced by a damping resistor.

The emitter circuit of transistor 24 includes a load resistor 27 from which an alarm voltage may be derived when the trigger is oscillating via a smoothing network 28, 29.

The collector circuit of transistor 24 includes the energizing winding of relay 17 in parallel with a diode 30 for suppressing the voltage peaks which occur across this winding when the energizing current is suppressed. Finally, a comparatively large capacitor 31 is connected between the emitter and the collector of transistor 24. When the trigger with its transistors 1, 2 is oscillating, said capacitor is periodically discharged via the emitter-collector path of transistor 24 and periodically charged via the winding of relay 17 and resistor 27, so that the relay 17 is continually energized by a direct current.

In the two embodiments described, the temperature variations of the base current-base voltage characteristic of input transistor 1 may readily be compensated by means of a resistor having a negative temperature coefficient which is connected in parallel or in series with resistor 14. For the same purpose, it would alternatively be possible to use a resistor having a positive temperature coefficient in parallel or in series with resistor 5. However, in this case, both threshold values of the monitoring circuit would be influenced, which is not desirable, since the second threshold value is substantially independent of temperature within the permissible range of temperatures.

The direct-voltage monitoring circuit of the kind described may be used in all those cases in which a direct voltage or a direct voltage derived from some magnitude or other must be maintained between two determined limits, for example for monitoring and/or controlling some chemical or physical process. It is particularly suitable as an alarm circuit for an alarming pilot receiver for a telecommunication system.

What is claimed is:

1. A direct-voltage monitoring circuit arrangement including an amplifier having input and output circuits, a first electronic amplifying element having a control electrode and a main current path, means for applying said monitored direct voltage to said control electrode, a regenerative feedback circuit coupled between said output and input circuits, a source of reference voltage, means for applying said reference voltage to said control electrode, said reference voltage having a polarity to bias said amplifying element to a substantially cut-off condition when the value of said monitored direct voltage lies below a first threshold value, said amplifier oscillating when the value of said monitored direct voltage lies above said first threshold value, said main current path including a relatively high load resistance causing saturation of said main current path when the value of said monitored direct voltage exceeds a second threshold value lying above said first threshold value, the amplification factor of the amplifier including said regenerative feedback circuit becoming less than unity upon said saturation whereby the amplifier ceases to oscillate.

2. A circuit as claimed in claim 1, further including a relay coupled to said output circuit, said relay being energized only when the amplifier is oscillating.

3. A circuit as claimed in claim 1, further including a rectifier coupled to said output circuit, said rectifier rectifying the oscillating signal of said amplifier, means for applying the signal produced by said rectifier to said control electrode.

4. A circuit as claimed in claim 3, further including a relay coupled to said output circuit, said relay being energized only when the amplifier is oscillating.

5. A circuit as claimed in claim 3, wherein said regenerative feedback circuit includes a second rectifier, and means for controlling the impedance of said second rectifier dependent on the rectified oscillations of the amplifier.

6. A circuit as claimed in claim 1, further comprising a second amplifying element, an R-C network for coupling the output of said first amplifying element to the input of said second amplifying element.

7. A circuit as claimed in claim 6, further comprising a third amplifying element and transformer means coupling the output of said second amplifying element to the input of said third amplifying element.

References Cited in the file of this patent

UNITED STATES PATENTS

| | | |
|---|---|---|
| 2,590,826 | Schenck | Mar. 25, 1952 |
| 2,851,613 | Welker | Sept. 9, 1958 |
| 2,870,310 | Van Overbeek | Jan. 20, 1959 |
| 2,907,931 | Moore | Oct. 6, 1959 |